Figure 1:
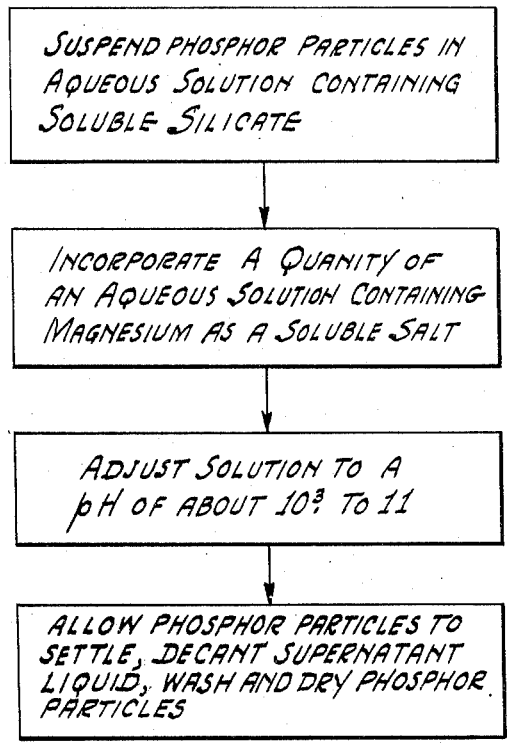

Dec. 24, 1957  T. W. EDWARDS ET AL  2,817,599
METHOD OF COATING PHOSPHOR PARTICLES
Filed Oct. 25, 1954

INVENTORS
GILMORE E. CROSBY &
THOMAS W. EDWARDS
BY J. C. Whittaker
ATTORNEY

United States Patent Office 2,817,599
Patented Dec. 24, 1957

2,817,599

METHOD OF COATING PHOSPHOR PARTICLES

Thomas W. Edwards, Lancaster, and Gilmore E. Crosby, Millersville, Pa., assignors to Radio Corporation of America, a corporation of Delaware Application October 25, 1954, Serial No. 464,504

9 Claims. (Cl. 117—33.5)

This invention relates to improvements in methods of treating phosphor particles, which particles may be used for making viewing screens for cathode ray tubes, luminescent lamps and kinescopes for television and the like.

Luminescent screens may be produced by first preparing a suspension of phosphor particles in a liquid and then settling the phosphor particles through the liquid onto a support for said screen. Subsequently, the supernatant liquid is decanted or siphoned off leaving a layer of phosphor material on said support. The zinc sulphide and zinc-cadmium sulphide phosphors have long been used in this type of process for making luminescent viewing screens for cathode ray tubes. For producing white-emitting viewing screens and television kinescopes, a mixture of two different phosphors are usually used, for example a blue-emitting zinc sulphide with silver activator and a yellow-emitting zinc-cadmium sulphide with silver activator.

When screens of this type are operated in kinescopes for long periods of time, they frequently develop X-burn. X-burn is a discoloration of the luminescent screen across the screen face. The discoloration usually extends from corner to corner in the shape of an X. The discolored areas also exhibit a marked decrease in luminescence efficiency.

One method for improving the resistance to X-burn of certain sulphide phosphors is to coat the phosphor particles with magnesium hydroxide and silicic acid. Such coatings may be produced, for example, by suspending the phosphor particles in water, stirring in a desired amount of an aqueous solution of a soluble silicate and a desired amount of an aqueous solution of magnesium as a soluble salt, and then settling the phosphor particles upon a suitable substrate. However, the resistance to X-burn of phosphors prepared by this process may not be uniform from batch to batch, because the amount of magnesium coated on the particles is difficult to control.

Furthermore, in forming luminescent screens by settling such coated phosphors from an aqueous suspension, certain difficulties are encountered. For example, there is a tendency for the layer of the settled material to be disturbed during the removal of the supernatant liquid. Also, there is relatively poor adherence to the support while the material is wet, so that the material tends to avalance if the support is not horizontal or has areas which are inclined to the horizontal, such as the curved edges of the face of a cathode ray tube. The ability of phosphor particles to remain in place after they are settled will be referred to as the "wet adherence" of the phosphor.

An object of the invention is to provide an improved method for treating particles of zinc sulphide and zinc cadmium sulphide phosphors both to render them resistant to X-burn and to improve their wet adherence properties.

Another object is to provide an improved method of treating sulphide phosphors to be used in making luminescent viewing screens for cathode ray tubes.

A further object is to provide improved luminescent viewing screens.

Briefly, the improved method of the invention comprises suspending phosphor particles, for example silver-activated zinc sulphide or silver-activated zinc-cadmium sulphide in a solution containing a soluble silicate and a soluble magnesium salt and carefully adjusting the pH of said solution and drying said phosphor particles in a manner not hitherto practiced in order to improve the wet adherence, X-burn resistance and uniformity of the product. The solution may contain $SiO_2$ as a soluble silicate, such as sodium-silicate or potassium-silicate and magnesium as a soluble salt, such as magnesium sulphate. The solution is adjusted to a pH between about 10.3 and 11. The phosphor particles are then washed and dried. The dry powder may be stored for indefinite periods and later suspended in an aqueous medium for settling onto the inner surface of the viewing face plate of a cathode ray tube or other suitable substrate.

Suspending the phosphor particles in a solution containing a soluble silicate and a soluble magnesium salt, adjusting the solution to a pH between 10.3 and 11 and then drying said phosphor particles produces a coating on the phosphor particles which imparts to the phosphor good wet adherence properties, good resistance to X-burn and relatively uniform properties from batch to batch.

Figure 2:
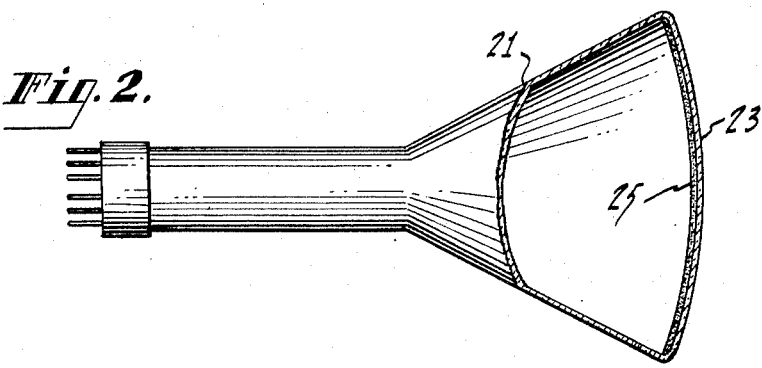

The invention will be more fully described in the following detailed description when read in connection with the drawing in which:

Figure 1 is a flow chart illustrating typical steps of the improved process of the invention and Figure 2 is a cross-sectional view of a cathode ray tube envelope having a luminescent viewing screen prepared in accordance with the invention.

A specific example illustrating the improved method of the invention will now be given.

*Example 1.*—11.5 pounds of finely-divided blue-emitting zinc sulphide with silver activator phosphor is slurried in approximately 46 pounds of water. The pH of this slurry is about 7.0. Then, about 667 cc. of a first aqueous solution containing 5% potassium silicate ($SiO_2/K_2O$ mol ratio=about 3.4) are added slowly with constant stirring to the phosphor slurry. This amount of potassium silicate solution contains about 1.5% by weight of $SiO_2$ with respect to the weight of the phosphor. The pH of the solution at this point is about 8.4.

Then, 1480 cc. of a second aqueous solution containing 0.25 gram of $MgSO_4 \cdot 7H_2O$ per cc. of solution is added slowly to the phosphor slurry with constant stirring. This amount of magnesium sulphate solution contains about 0.7% by weight of magnesium with respect to the weight of phosphor. The pH of the solution at this point is about 7.8.

A third aqueous solution containing about 10% by weight of potassium hydroxide is added slowly to the phosphor slurry with constant stirring until the slurry has a pH of about 10.5. About 1883 cc. is required to reach this pH.

The mixture is stirred for about 30 minutes to assure complete interaction of the constituents. The phosphor particles are permitted to settle and the supernatant liquid siphoned off. The remaining phosphor is washed by filtration, dried at 150° C. and passed through a 250 mesh screen. A chemical analysis shows that the final coated phosphor particles contain about 0.63% by weight of $SiO_2$ and 0.62% by weight of magnesium. The coated phosphor has good X-burn resistance and the wet adherence is at least 2 to 4 times greater than a product produced outside the pH range of 10.3 to 11.

The reasons for the unexpected and improved results are not clearly understood. Upon the adjustment of the pH to about 10.5, it is believed that an outer coating of magnesium hydroxide forms over the phosphor particles. When this coating is formed within the pH range of 10.3 to 11, the wet adherence of the particles is at least 100% greater than when the coating is formed outside this range. A pH of 10.5 is preferred. Furthermore, the additional step of drying the phosphor particles increases the wet adherence to at least 100% greater than when phosphor screens are settled directly from the coating solutions.

The solutions containing $SiO_2$ and magnesium may be introduced together or in any desired order with respect to one another. The subsequent adjustment of the solution to a pH of about 10.5 produces a consistently uniform product which is X-burn resistant and which has good wet adherence properties. If the phosphor slurry is adjusted to a pH above 11, the resulting product has poor wet adherence. If the phosphor slurry is adjusted to a pH below 10.3, the resulting product has both poor wet adherence and poor resistance to X-burn.

Coatings of comparable thickness may be obtained by adding relatively small amounts of magnesium and adjusting the solution to a pH above 11 or by adding relatively large amounts of magnesium without a pH adjustment, resulting in a pH below 10.3. However, since different results are obtained for the same coating thicknesses when they are produced in phosphor slurries having different pH's, factors other than the thickness of the coating are probably involved.

In addition to adjusting the phosphor slurry to a pH between 10.3 and 11, it is preferred to control the proportion of silicate, magnesium and phosphor such that the slurry contains between about 0.5 and 3.0% by weight of $SiO_2$ as a soluble silicate with respect to the weight of said phosphor and between about 0.25 and 1.5% by weight of magnesium, as a soluble salt, with respect to the weight of said phosphor.

In all of the process steps, materials of the highest purity are used. Calomel and glass electrodes are immersed in the reaction mixture throughout the entire process permitting continuous pH readings to be made. The water used should be demineralized or distilled.

Other substances may be used in place of potassium silicate, for example, sodium silicate, ethyl silicate or other soluble silicates. Similarly, any soluble magnesium salt such as magnesium chloride or magnesium nitrate may be used in place of magnesium sulphate. Other alkalies such as sodium hydroxide may be used in place of potassium hydroxide. While a pH of about 10.5 is preferred, any pH in the range of 10.3 to 11 may be used.

*Example 2.*—The process is equally effective for coating other phosphors. As an example, steps identical to the steps of Example 1 are carried out except that a silver-activated zinc-cadmium sulphide is substituted for silver-activated zinc sulphide and 1030 cc. of an aqueous solution containing 0.25 gram of $MgSO_4 \cdot 7H_2O$ per cc. of solution is used. This amount of magnesium contains about 0.48% by weight of magnesium with respect to the weight of the phosphor. A chemical analysis shows that the final coated phosphor contains about 0.64% by weight of $SiO_2$ and 0.45% by weight of magnesium.

Referring to Figure 1, the method in accordance with the invention includes first suspending the phosphor particles in an aqueous solution containing a soluble silicate. A quantity of an aqueous solution containing magnesium as a soluble salt is then incorporated into the solution. The solution is adjusted to a pH between about 10.3 and 11. Following this, the phosphor particles are allowed to settle, the supernatant liquid decanted and the phosphor particles washed and dried.

The product, made as described in either of the above two examples may be used to prepare a luminescent viewing screen on the inner surface of a cathode ray tube. The phosphors may be used alone, or in combination with one another to produce a white-emitting screen, or in combination with phosphors of other types.

The screen may be prepared by any well-known process. For example the tube envelope may be placed neck upward and a quantity of distilled water poured into the open end to serve as a cushioning medium. The dried and coated phosphor particles, prepared as above described, are suspended in distilled water and the suspension poured into the cushioning medium. A small quantity of sodium or potassium silicate may be incorporated in the cushioning medium or in the phosphor suspension to serve as a binder for the screen particles. The phosphor particles are permitted to settle upon the inner face of the tube envelope to form a layer of luminescent material. The supernatant liquid is then slowly decanted, the phosphor screen dried and then baked to drive off all of the volatile materials.

Referring to Figure 2, a cathode ray tube 21 has a face plate 23 and a phosphor screen 25 deposited on the inner surface of the face plate 23 according to the above described process.

Zinc sulphide with silver activator is frequently used as the blue component of a tri-color kinescope. During manufacture, a plurality of blue-emitting, red-emitting and green-emitting phosphor dots are deposited in a suitable substrate in a predetermined order of cyclic succession. Subsequently the substrate having the dots thereon is baked-out to volatilize various solvents and binders. One difficulty which arises is that the phosphors become contaminated from the environment. Where the contaminant is copper, for example, the copper is baked into the blue phosphor converting the phosphor to a green-emitting phosphor. The coatings and methods of the invention have been found to prevent contaminants from affecting the emission color of the phosphor dots.

There have been described an improved process for treating phosphors which process produces a product that has good wet adherence properties and which is resistant to X-burn and which is uniform from batch to batch. There has further been described improved luminescent screens prepared by the improved methods of the invention.

What is claimed:

1. A method of coating phosphor particles selected from the class consisting of zinc sulphide and zinc-cadmium sulphide comprising suspending said phosphor particles in an aqueous solution containing a soluble silicate, and a soluble magnesium salt, adjusting said solution to pH between 10.3 and 11 by adding thereto an alkali metal hydroxide and then drying said particles.

2. Phosphor particles prepared according to the process of claim 1.

3. A method of coating phosphor particles comprising slurrying silver-activated zinc sulphide phosphor particles with water, stirring into said slurry a first aqueous solution containing $SiO_2$, as a soluble silicate, stirring into said slurry a second aqueous solution containing a predetermined amount of magnesium, as a soluble salt, adjusting the resulting solution to a pH between about 10.3 and 11 by adding thereto a material selected from the class consisting of potassium hydroxide and sodium hydroxide and then drying said particles.

4. A method of coating phosphor particles comprising slurrying silver-activated zinc-cadmium sulphide phosphor particles with water, stirring into said slurry a first aqueous solution containing a soluble silicate, stirring into said slurry a second aqueous solution containing a predetermined amount of magnesium as a soluble salt, adjusting the resulting solution to a pH between about 10.3 and 11 by adding thereto a material selected from the class consisting of potassium hydroxide and sodium hydroxide and then drying said phosphor particles.

5. A method of coating phosphor particles comprising the steps in the following order: slurrying phosphor particles with water, stirring into said slurry an aqueous potassium silicate solution, said silicate solution containing between 0.5 to 3.0% by weight of $SiO_2$ with respect to said phosphor, stirring into said slurry an aqueous magnesium sulphate solution, said magnesium sulphate solution containing between 0.25 and 1.5% by weight of magnesium with respect to said phosphor, stirring into said slurry a sufficient quantity of a potassium hydroxide solution to adjust said slurry to a pH of about 10.5, agitating said slurry until the constituents therein have interacted, washing said phosphor particles with water, drying said phosphor particles at about 150° C. and then screening said phosphor particles through a 250 mesh screen.

6. A method of coating phosphor particles comprising the steps in the following order: slurrying phosphor particles selected from the class consisting of silver-activated zinc sulphide and silver-activated zinc-cadmium sulphide with about four times its weight of water, stirring into said slurry an aqueous potassium silicate solution, said silicate solution containing between 0.5 and 3.0% by weight of $SiO_2$ with respect to said phosphor, stirring into said slurry an aqueous magnesium sulphate solution said magnesium sulphate solution containing between 0.25 and 1.5% by weight of magnesium with respect to said phosphor, stirring into said slurry a sufficient quantity of a potassium hydroxide solution to adjust said slurry to a pH of about 10.5, agitating said slurry until the constituents therein have interacted, allowing the phosphor particles in said slurry to settle, decanting the supernatant liquid from said settled phosphor, washing said phosphor particles with water, drying said phosphor particles at about 150° C. and then screening said phosphor particles through a 250 mesh screen.

7. In a method of treating a powdered phosphor to be used in making luminescent screens, the steps comprising suspending said phosphor in a dilute solution of a soluble silicate in which silica is present in an amount of about 0.5% to about 3.0% by weight of said phosphor, incorporating into said suspension between 0.5% and 1.5% by weight, with respect to said phosphor, of magnesium as a soluble salt, adjusting said solution to a pH between 10.3 and 11 by adding thereto an alkali metal hydroxide and then drying said phosphor.

8. A luminescent viewing screen comprising a base having on a surface thereof a layer comprising phosphor particles, said particles having a coating thereon produced by immersing said particles in a solution containing a soluble silicate and a soluble magnesium salt, adjusting said solution to a pH between 10.3 and 11 by adding thereto an alkali metal hydroxide and then drying said particles.

9. A luminescent viewing screen comprising a glass base having on a surface thereof a layer comprising phosphor particles from the class consisting of zinc sulphide and zinc-cadmium sulphide, the particles of said phosphor having a coating thereon produced by suspending said particles in an aqueous solution containing a magnesium salt and a soluble silicate and having a pH between 10.3 and 11 by adding thereto a material selected from the class consisting of potassium hydroxide and sodium hydroxide, and then drying said particles.

References Cited in the file of this patent

UNITED STATES PATENTS

| | | |
|---|---|---|
| 2,536,586 | Waye et al. | Jan. 2, 1951 |
| 2,684,306 | Brewer et al. | July 20, 1954 |
| 2,704,726 | Markoski | Mar. 22, 1955 |

FOREIGN PATENTS

| | | |
|---|---|---|
| 449,392 | Great Britain | June 19, 1936 |